United States Patent
Wallach et al.

(10) Patent No.: US 6,374,155 B1
(45) Date of Patent: Apr. 16, 2002

(54) AUTONOMOUS MULTI-PLATFORM ROBOT SYSTEM

(75) Inventors: Bret A. Wallach, San Diego; Harvey A. Koselka, Trabuco Canyon; David L. Gollaher, San Diego, all of CA (US)

(73) Assignee: Personal Robotics, Inc., San Diego, CA (US)

( * ) Notice: Subject to any disclaimer, the term of this patent is extended or adjusted under 35 U.S.C. 154(b) by 0 days.

(21) Appl. No.: 09/449,177

(22) Filed: Nov. 24, 1999

(51) Int. Cl.⁷ .............................................. G06F 19/00
(52) U.S. Cl. ........................... 700/245; 701/23; 701/24; 701/25; 701/26; 701/208; 701/342; 701/351.1; 701/357.06; 701/357.13; 701/340; 701/457; 701/435; 701/318; 701/587
(58) Field of Search ........................... 700/245; 701/208, 701/24, 213, 26, 206, 25, 123, 207, 300, 23, 200, 41, 3, 11, 225, 1, 120, 215, 301; 318/587; 342/357.1, 357.06, 357.13, 457; 180/167; 340/435, 903, 988

(56) References Cited

U.S. PATENT DOCUMENTS

| | | |
|---|---|---|
| 4,647,784 A | 3/1987 | Stephens |
| 4,709,265 A | 11/1987 | Silverman et al. |
| 5,086,262 A | 2/1992 | Hariki et al. |
| 5,179,329 A | 1/1993 | Nishikawa et al. |
| 5,220,263 A | 6/1993 | Onishi et al. |
| 5,254,923 A | 10/1993 | Kanitani |
| 5,266,875 A | 11/1993 | Slotine et al. |
| 5,333,242 A | 7/1994 | Watanabe et al. |
| 5,382,885 A | 1/1995 | Salcudean et al. |
| 5,488,277 A | 1/1996 | Nishikawa et al. |
| 5,568,030 A | 10/1996 | Nishikawa et al. |
| 5,819,008 A | 10/1998 | Asama et al. |
| 5,825,149 A | 10/1998 | Matsumoto et al. |
| 5,825,813 A | 10/1998 | Na |
| 5,825,981 A | 10/1998 | Matsuda |
| 5,867,800 A | 2/1999 | Leif |
| 6,252,544 B1 * | 6/2001 | Hoffberg .................. 342/357.1 |

FOREIGN PATENT DOCUMENTS

WO        WO 01/37060 A1        5/2001

OTHER PUBLICATIONS

Dudek, et al., Robust Positioning with a Multi–Agent Robotic System, 1993.
Rekleitis, et al., Reducing Odometry Error Through Cooperating Robots During the Exploration of an Unknown World, 1997.

(List continued on next page.)

Primary Examiner—William A. Cuchlinski, Jr.
Assistant Examiner—McDieunel Marc
(74) Attorney, Agent, or Firm—Knobbe, Martens, Olson & Bear, LLP

(57) ABSTRACT

An autonomous mobile robot system allocates mapping, localization, planning and control functions to at least one navigator robot and allocates task performance functions to one or more functional robots. The at least one navigator robot maps the work environment, localizes itself and the functional robots within the map, plans the tasks to be performed by the at least one functional robot, and controls and tracks the at least one functional robot during task performance. The at least one navigator robot performs substantially all calculations for mapping, localization, planning and control for both itself and the functional robots. In one implementation, the at least one navigator robot remains stationary while controlling and moving the at least one functional robot in order to simplify localization calculations. In one embodiment, the at least one navigator robot is equipped with sensors and sensor processing hardware required for these tasks, while the at least one functional robot is not equipped with sensors or hardware employed for these purposes.

27 Claims, 10 Drawing Sheets

OTHER PUBLICATIONS

Rekleitis, et al., Multi-Robot Exploration an Unknown Environment, *Efficiently Reducing the Odometry Error*, 1997.

Prassler, et al., Tracking Multiple Moving Objects for Real-Time Robot Navigation, *Autonomous Robots 8*, pp. 105-116 2000.

Prassler, et al., A Short History of Cleaning Robots, *Autonomous Robots 9*, pp. 211-226 2000.

Fiorini, et al., Cleaning and Household Robots: A Technology Survey, *Autonomous Robots 9*, pp. 227-235 2000.

Prassler, et al., Tracking People in a Railway Station During Rush-Hour, International Computer Vision Systems Proceedings, pp. 162-179 Jan. 1999.

Prassler, et al., Maid: A Robotic Wheelchair Operating in Public Environments, *Sensor Based Intelligent Robots*, International Workshop, pp. 68-95 Sep. 1998.

Prassler, Erwin, Robot Technology Improving Human Lifestyle, www.nt.nada.kth.se/numero/1999/99.15.html, Apr. 23, 1999.

"Robot Spatial Perception by Stereoscopic vision and 3D Evidence Grids" by Hans Moravec, Robotics Institute, Carnegie Mellon University, Pittsburgh, PA Sep. 1996. pp. 1-29 @ www.frc.ri.cmu.edu.

"Robot Spatial Perception by Stereoscopic Vision and 3D Evidence Grids" by Hans P. Moravec, CMU-RI-TR-96-34, Sep. 1996. pp. 1-3 @ www.frc.ri.cmu.edu.

Hashimoto, M., et al., "Coordinative Object-Transportation by Multiple Industrial Mobile Robots Using Coupler With Mechanical Compliance", Proceedings of the International Conference on Industrial Electronics, Control, and Instrumentation (IECON), IEEE, pp. 1577-1582, Nov. 15, 1993.

Ishida, Y., et al., "Functional Complement by Cooperation of Multiple Autonomous Robots", Proceedings of the International Conference on Robotics and Automation, IEEE Comp. Soc. Press, vol. Conf. 11, pp. 2476-2481, May 8, 1994.

Kurazume, R., et al., "Cooperative Positioning with Multiple Robots", Proceedings of the International Conference on Robotics and Automation, IEEE Comp. So. Press, vol. Conf. 11, pp. 1250-1257, May 8, 1994.

Ozaki, K., et al., "Synchronized Motion by Multiple Mobile Robots Using Communication", Proceedings of the IEEE/RSJ International Conference on Intelligent Robots and Systems, IEEE, pp. 1164-1170, Jul. 26, 1993.

Yuta, S., et al., "Coordinating Autonomous and Centralized Decision Making to Achieve Cooperative Behaviors Between Multiple Mobile Robots", Proceedings of the IEEE/RSJ International Conference on Intelligent Robots and Systems, IEEE, pp. 1566-1574, Jul. 7, 1992.

Baloch et al., A neural system for behavioral conditioning of mobile robots, 1990, IEEE, pp. 723-728.*

Rak et al., A sensor-based navigation for a mobile robot using fuzzy logic and reinforcement learning, 1995, IEEE, pp. 464-477.*

Kotay et al., Task-reconfigurable robots: Navigators and manipulators, 1997, IEEE, pp. 1081-1089.*

Marco et al., Local area navigation using sonar feature extraction and model based predictive control, 1996, IEEE, pp. 67-77.*

* cited by examiner

AUTONOMOUS MULTI-PLATFORM ROBOT SYSTEM

FIELD OF THE INVENTION

The present invention relates generally to mobile robot systems and, more particularly, relates to a system and method for allocating mapping, localization, planning, control and task performance functions in an autonomous multi-platform robot environment.

BACKGROUND OF THE INVENTION

Mobile robots have been designed, developed and deployed to handle a variety of tasks such as cleaning and security. Most mobile robots are non-autonomous; that is, they are unable to autonomously navigate. The economic benefits provided by non-autonomous robots are limited by the inflexible behavior of the robots and their extensive installation costs. Skilled technicians often must be hired and paid to preprogram the robots for specific routes and tasks. It may be necessary to install objects in the environment to guide the robots, such as tracks, buried signal emitting wires, markers or sensors. Further modifications to the environment may also be necessary to minimize installation and operational problems.

Some mobile non-autonomous robots can detect obstacles blocking their paths, and can stop or deviate slightly from their paths to avoid such obstacles. If the environment is modified significantly, however, such as by moving a large item of furniture, conventional non-autonomous robots do not properly react. Part or all of the installation process often must be repeated. Given this limitation, non-autonomous robots are usually deployed only on stable and high value routes. Though some non-autonomous robots rely on random motion to perform their tasks, such as pool cleaning robots, only a limited number of applications are amenable to this approach.

Fully autonomous mobile robots have begun to emerge from research laboratories during the past few years. Autonomous robots are able to navigate through their environment by sensing and reacting to their surroundings and environmental conditions.

Autonomous robot navigation involves four primary tasks: mapping, localization, planning and control. These closely related concepts are analogous to asking the questions "Where am I?" (mapping and localization), followed by "Where do I want to be?" or "What do I want to do?" (planning), and finally, "How do I get there?" or "How do I do that?" (control).

Once mapping is complete, the robot's current position, orientation and rate of change within the map must be determined. This process is referred to as localization. Autonomous robots that rely on 2D mapping and localization are often not able to navigate with adequate reliability due to the relative simplicity of the map. Often, the robots become lost, stuck or fall. Use of dynamic 3D mapping and localization, by contrast, permits navigation that is more reliable but involves complex calculations requiring a large amount of computational overhead. 3D maps typically have millions of cells, making straightforward operations such as landmark extraction, localization and planning computationally intensive. The resulting computational delays limit the speed of robot movement and task performance.

Once mapping and localization are accomplished, task planning and performance must be undertaken. Some localization will still be required during task performance. With one robot, attempting to localize while performing tasks leads to unacceptable delays. If multiple robots are used, the tradeoffs described above are often still present, and must now be dealt with multiple times over.

In view of the above, an autonomous, multi-robot system having fast, accurate and cost effective mapping and localization, as well as effective planning and allocation of tasks is needed.

SUMMARY OF THE INVENTION

The present invention is directed toward a system and method for allocating mapping, localization, planning, control and task performance functions in a multi-robot environment. The system comprises at least one navigator robot platform and one or more functional robot platforms that perform predetermined tasks.

For each task, a navigator and a given functional robot work in tandem.

Mapping, localization, planning, and control functions are assigned to the at least one navigator robot, and functional tasks are assigned to the one or more functional robots. In one implementation, the system is used for cleaning the interior of a house or office. In this implementation, the functional robots perform the tasks of vacuuming, sweeping, mopping, cleaning bathroom fixtures, etc., while the navigator robot navigates, maneuvers and monitors the functional robots.

In one embodiment, the navigator robot performs all or substantially all calculations for mapping, localization, planning and control for both itself and the functional robots. Accordingly, the navigator is equipped with sensors and sensor processing hardware required for these tasks. The functional robots in this embodiment, conversely, do not perform any or only a few of the calculations for localization, planning, or control and, therefore, are not equipped with sensors or hardware employed for these purposes.

Accordingly, in one embodiment, a system of autonomous robots is provided comprising: at least one first mobile robot configured to performed one or more repetitive tasks within an area; and at least one second robot configured to direct overall movement of the at least one first robot in the area.

In another embodiment, a method of performing a repetitive task within an area is provided comprising the steps of: performing the repetitive task with at least one first mobile robot; and directing overall movement at the at least one first robot in the area with at least one second robot.

In yet another embodiment of the present invention, a system of autonomous, mobile robots operating within an environment is provided. The system comprises one or more functional mobile robots that are responsible for performing functional tasks. The system further comprises one or more navigator mobile robots that localize themselves and the functional robot(s) within the environment, plan the tasks to be performed by the functional robot(s), and control the functional robot(s) during task performance. In one embodiment, when a functional robot is moving, the navigator robot(s) controlling it remain stationary.

In yet another embodiment of the present invention, a method for autonomous, multi-robot operation is provided. The method comprises the steps of:

(a) providing at least one navigator robot and at least one functional robot;

(b) with the at least one navigator robot, creating a map of the environment;

(c) with the at least one navigator robot, localizing the at least one navigator robot and the at least one functional robot within the map;

(d) with the at least one navigator robot, planning tasks to be performed by the at least one functional robot;

(e) with the at least one functional robot, performing the tasks planned by the at least one navigator robot; and (f) with the at least one navigator robot, controlling and tracking the at least one functional robot during task performance.

The present invention also provides a method of implementing an autonomous mobile platform system. The method comprises the following steps:

providing multiple mobile platforms;

allocating mapping, localization, planning and control functions to a first set of the mobile platforms;

allocating functional task performance functions to a second set of the mobile platforms;

mapping the environment, localizing substantially all platforms within the environment and planning task performance with the first set of mobile platforms;

performing the tasks with the second set of mobile platforms; and controlling and tracking the task performance by the second set of platforms with the first set of platforms.

Further features and advantages of this invention as well as the structure of operation of various embodiments are described in detail below with reference to the accompanying drawings.

BRIEF DESCRIPTION OF THE DRAWINGS

The present invention is described with reference to the accompanying drawings. In the drawings, like reference numbers indicate identical or functionally similar elements.

DETAILED DESCRIPTION OF THE INVENTION

1. Introduction

The present invention is directed toward a system and method for allocating mapping, localization, planning, control and task performance in a multi-robot environment. In particular, and in accordance with one embodiment of the invention, mapping, localization, planning and control functions are assigned to a mobile platform (the navigator), and task performance functions are assigned to at least one second mobile platform (the functional robot).

The present invention overcomes the drawbacks of conventional systems currently in use by providing near real-time maneuvering and task completion. An ideal application of the present invention is in household or office cleaning, which typically involves multiple and repetitive tasks such as vacuuming, sweeping and mopping. The present invention, however, could be implemented in any environment where multiple robots are maneuvered to perform assigned tasks.

2. System Components

Figure 1:
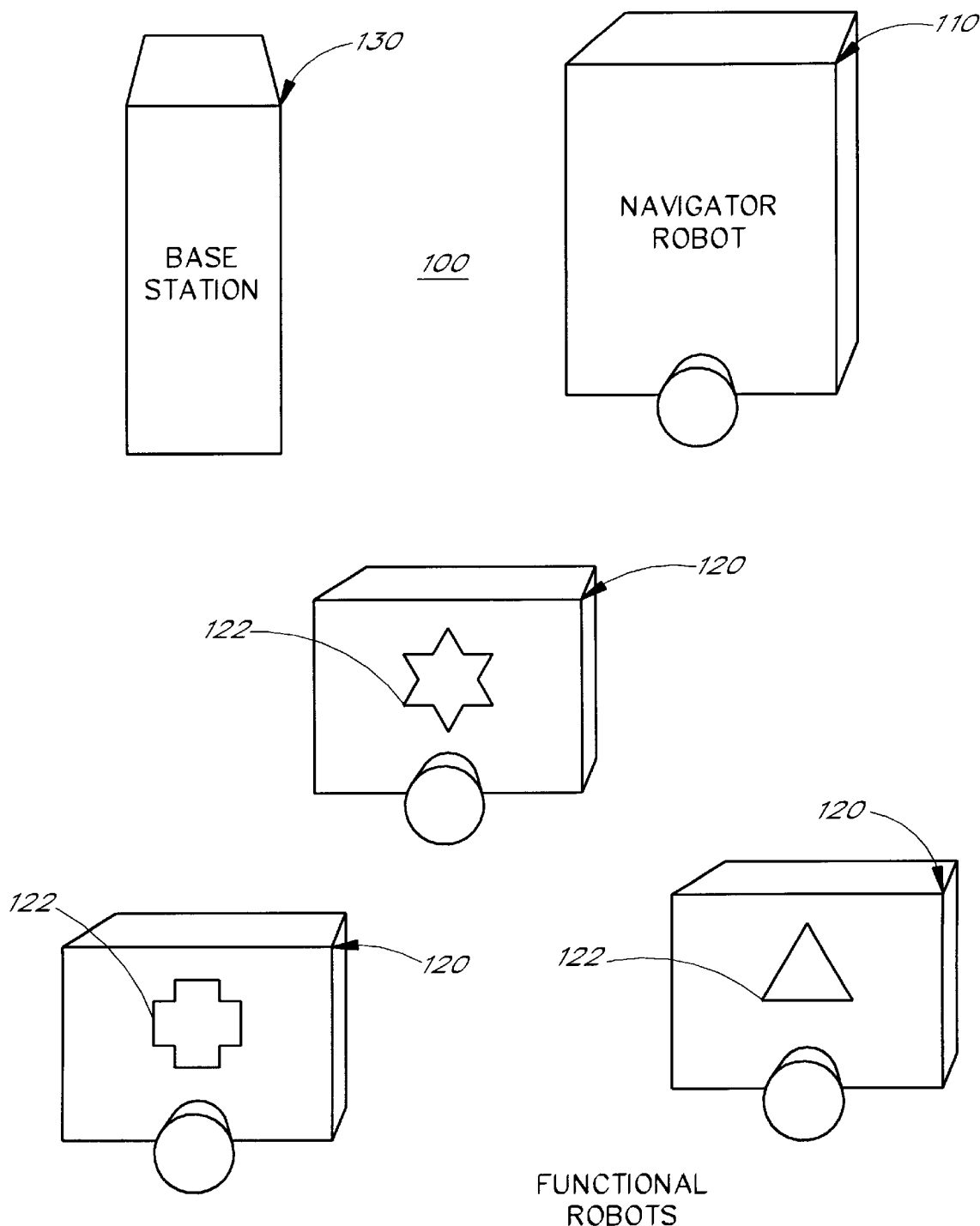
FIG. 1 is a block diagram of a multi-robot system according to the present invention.

FIG. 1 is a block diagram of a multi-robot system 100 according to the present invention. System 100 includes a navigator mobile robot 110, multiple functional robots 120, and (optionally) a base station 130. It should be noted that base station 130, while providing advantages that will be described below, is not required in all embodiments.

Base station 130, if included, may be equipped with charging stations to recharge the mobile robots 110 and 120. Moreover, base station 130 may be configured to assist in task performance. If, for example, system 100 is implemented in a residential cleaning environment, base station 130 may be equipped with a dustbin, trash bin, water reservoir, and the like, to aid in the performance of the required tasks.

In one embodiment, navigator 110 is responsible for all or substantially all mapping, localization, planning and control functions. It creates and maintains environment maps, a list of tasks to be accomplished, a task schedule and a charging schedule. Navigator 110 is configured with all sensors and hardware required for navigating and maneuvering itself as well as functional robots 120. In this regard, navigator 110 has a transmitter for communicating commands to functional robots 120.

Functional robots 120 carry out specific tasks and may be shaped and sized to facilitate performance of those tasks. Robots 120 are equipped with receivers for receiving commands from navigator 110 and, as shown in FIG. 1, unique shapes or markings 122 may be applied to robots 120 to assist navigator 110 in recognizing, locating and tracking them. In one embodiment, robots 120 are preferably not equipped with additional sensors, sensor hardware and the like, as navigator 110 performs these functions. If desired, however, robots 120 may be equipped with sensors and the like in order to improve their functionality.

a. Navigator Robot

Figure 2:
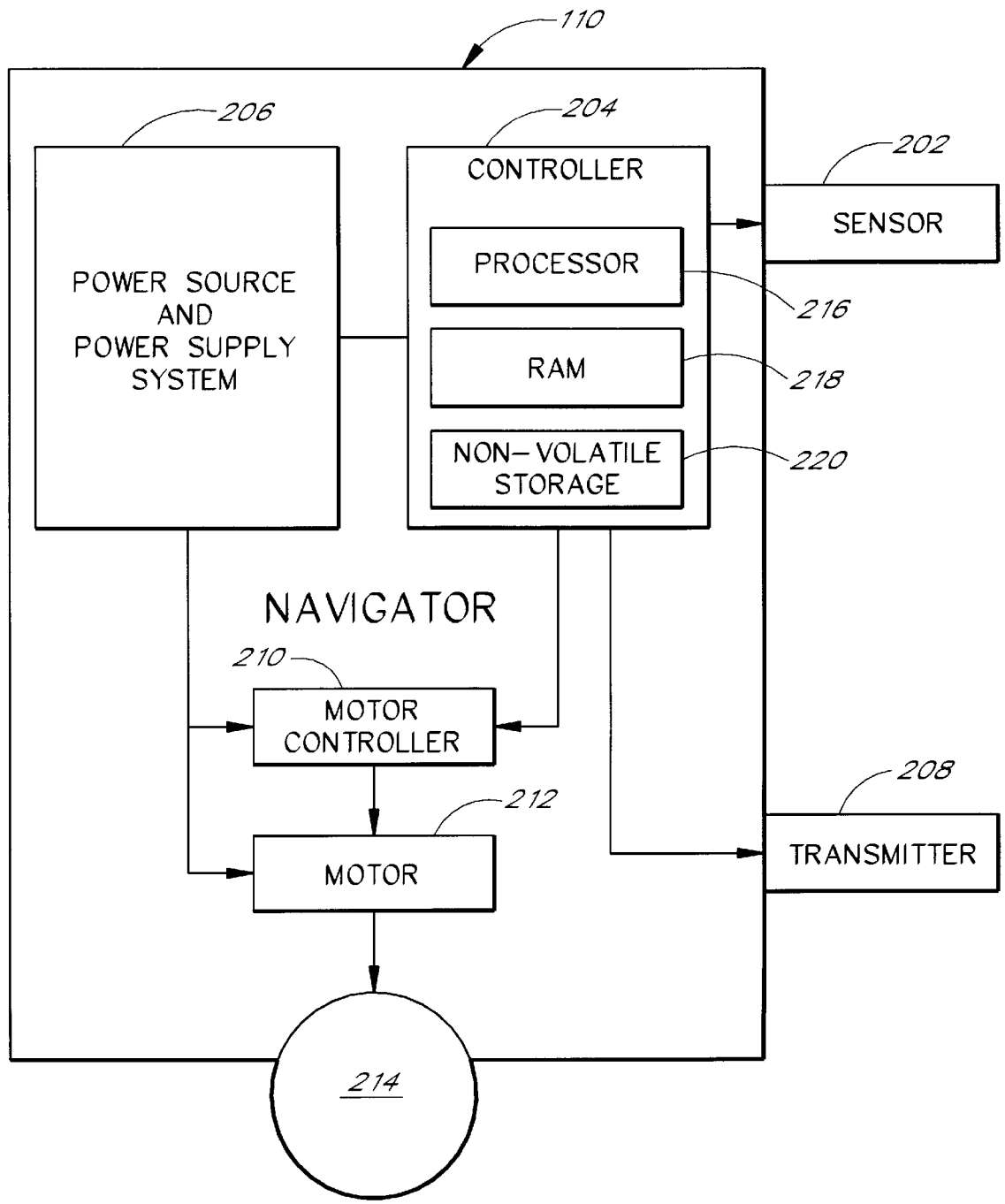
FIG. 2 is a block diagram of a navigator robot according to the present invention.

FIG. 2 is a block diagram of a navigator robot 110 according to one embodiment of the present invention. The particular implementation of robot 110 shown in FIG. 2 is provided for illustrative purposes only and should not be interpreted as requiring a specific physical architecture for navigator 110.

A sensor 202 is mounted on navigator 110. Sensor 202 may be any type of sensor that is suitable for the robot's environment, and multiple sensors may be utilized. It may be mounted in a fixed position or, alternatively, may be configured such that it is able to change position and orientation relative to navigator 110. Depending on the sensor type and system complexity, the position and orientation of sensor 202 may or may not be under the control of navigator 110.

In one example implementation, sensor 202 is a camera that records optical images of the surrounding environment. In another implementation, sensor 202 comprises a set of cameras to provide stereo vision for obtaining more detailed and accurate information about the robot's environment. Other sensor options include, but are not limited to, radar, lidar, sonar and/or combinations thereof. The operation and configuration of such sensors will be familiar to those of ordinary skill in the art. Navigator 110 further comprises controller 204, power source and power supply system 206, transmitter 208, motor controller 210, motor 212 and wheels 214. Controller 204 comprises a processor or central processing unit (CPU) 216, a temporary storage or RAM 218, and a non-volatile storage 220. Information such as maps and task schedules are stored in non-volatile storage 220 which, in one implementation, is an EPROM or EEPROM. Controller 204 receives and processes information from sensor 202 regarding the robot's surrounding environment. This may include information such as the location of navigator 110, the location of the other functional robots 120, nearby landmarks and so on. Controller 204 uses this information to determine what tasks or movements should occur next.

Controller 204, based on the available information, controls the locomotion and maneuvering of navigator 110. The method and means by which navigator 110 maneuvers itself and effects locomotion is termed the "control loop", and includes motor controller 210, motor 212 and wheels 214. Controller 204, based on information from sensor 202, sends appropriate commands to motor controller 210. Motor controller 210 directs motor 212 in accordance with these commands. Motor 212, in turn, drives wheels 214. In some implementations, depending on the method and complexity of locomotion, the control loop may also include servos, actuators, transmitters and the like. The control loop may also collect and transmit odometry data to controller 204.

Figure 3:
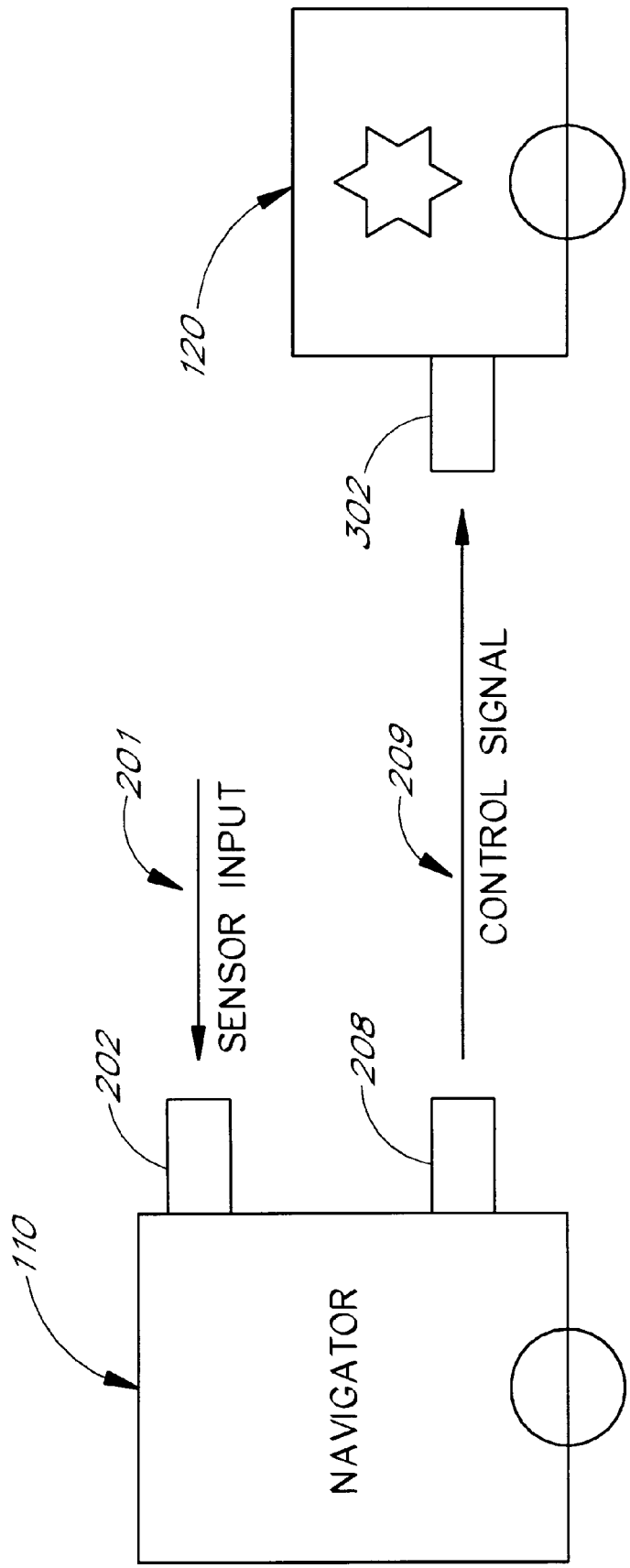
FIG. 3 is a block diagram depicting communication between a navigator and a functional robot.

As depicted in FIG. 3, in one embodiment, controller 204 also controls the movement of functional robots 120 via transmitter 208. Controller 204 processes sensor input 201 received by sensor 202 to determine what task, movement or other function the functional robot(s) should undertake next. Transmitter 208 transmits appropriate control signals 209 to receiver 302 of functional robot 120.

Transmitter 208 and receiver 302 may use any suitable communication means and medium. In one implementation, acoustic waves are used for communication between navigator 110 and functional robot 120. In one implementation example, an acoustic wave at one frequency would mean move in one direction (i.e., from navigator 110 to functional robot 120, while an acoustic wave at another frequency would mean move in another direction (i.e., from functional robot 120 to navigator 110). Other suitable communication means include, but are not limited to, wired or wireless communication, infrared signals and magnetic induction.

b. Functional Robots

Figure 4:
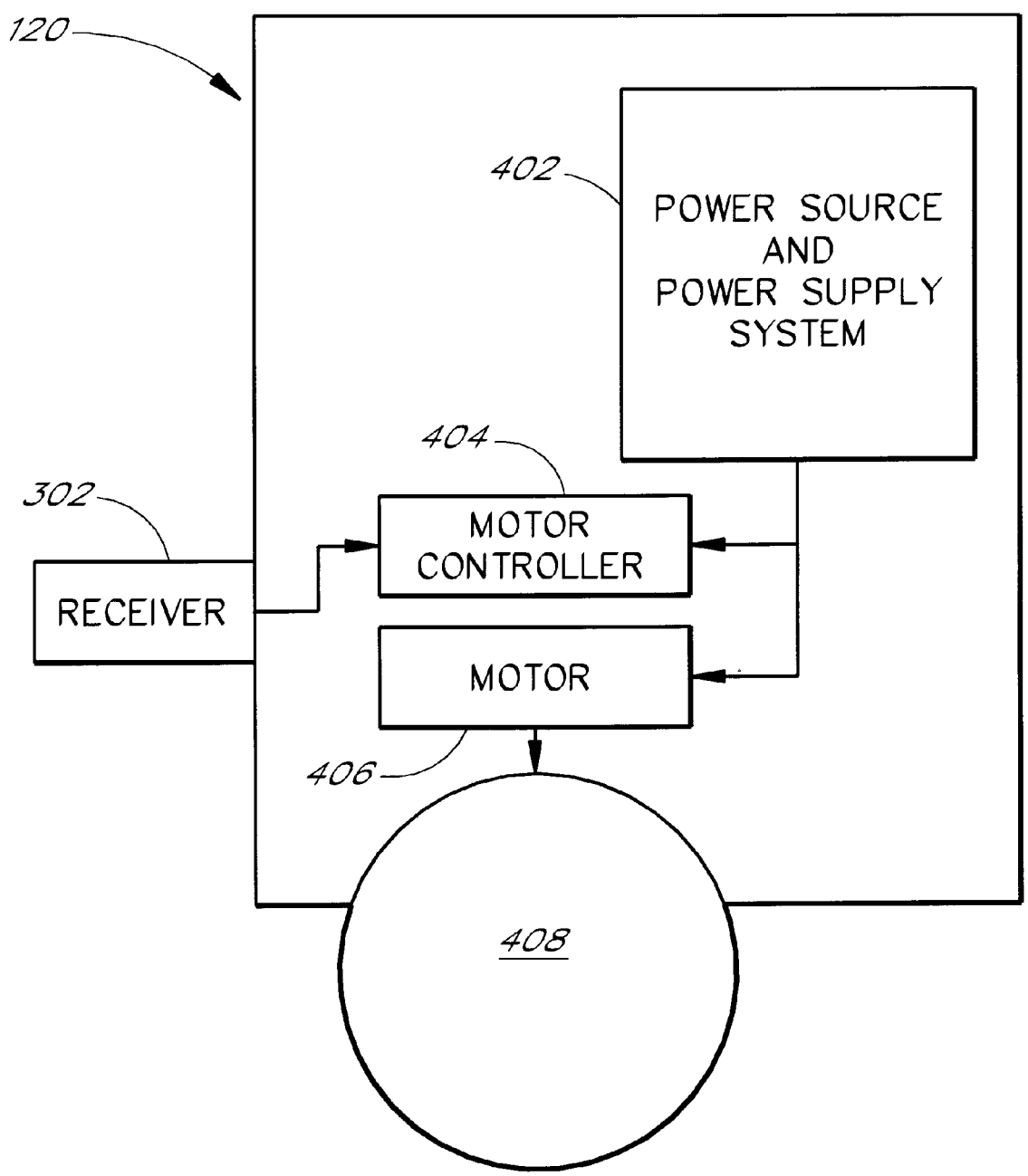
FIG. 4 is a block diagram of a functional robot according to the present invention.

FIG. 4 is a block diagram of a functional robot 120 according to one embodiment of the present invention. Again, the particular implementation of robot 120 shown in FIG. 4 is provided for illustrative purposes only and should not be interpreted as requiring a specific physical architecture for robot 120. As described above, functional robot 120 includes a receiver 302. The control loop for moving and maneuvering robot 120 comprises power source and power supply system 402, motor controller 404, motor 406 and wheels 408. Control signals received from navigator 110 via receiver 302 direct motor controller 404. Controller 404 controls motor 406, which in turn drives wheels 408. The control loop may also comprise servos, actuators, transmitters and the like.

The power source and supply modules of navigator 110 and functional robot 120 may be similar or identical. The power source portion may comprise any suitable power source including, but not limited to, batteries, electrical outlets, fuel cells, internal combustion or other engines, or combinations thereof The power supply portion conditions the power source and distributes it to meet any applicable specifications or requirements.

3. System Operation

As noted above, the present invention provides a system and method for allocating mapping, localization, planning, control and task performance in a commercial multirobot environment. In particular, in one embodiment, mapping, localization, preplanning, and planning and control functions are assigned to a mobile platform (the navigator), and task performance functions are assigned to at least one second mobile platform (the functional robot). Each function (mapping, localization, preplanning, planning and control and task performance) is discussed below.

a. Mapping

In one embodiment, navigator 110 performs all or substantially all mapping functions. Mapping is the process by which a representation of the environment is created and updated from sensor data and preprogrammed input. Several maps having different levels of resolution, stability and/or coordinate systems may be maintained. Dynamic mapping maintains the current dynamic map (CDM), which is a probabilistic two-dimensional (2D) or three-dimensional (3D) map of the robot's environment. A static map of the environment's outer perimeter (i.e. room walls or yard boundaries) may also be created. The maps created by navigator 110 are stored in RAM 218 or non-volatile memory 220.

The iterative mapping process essentially comprises the steps of moving to a new position, collecting sensor data of the objects and obstacles in the immediately surrounding area, performing localization, and updating the dynamic map to incorporate information derived from the new sensor data. This process is computationally intensive and time consuming. As will be explained, however, consolidation of these mapping functions in navigator 110 reduces the time required for mapping to a fraction of the time that conventional systems require for mapping.

As noted above, in addition to a dynamic map of the environment, a static map of the environment's outer perimeter may be created. The static map may include, for example, the walls of a building or the boundaries of a yard. It may be predetermined and input to navigator 110 or, alternatively, navigator 110 may make a static map of the environment. before task performance is initiated. In the latter case, in one embodiment, navigator 110 follows a physically distinct perimeter, maintaining a dynamic map as it moves and incorporating perimeter information from the dynamic map into the static map. The process continues until the static map is complete, consistent and stable.

The process or creating the static map is relatively long and iterative. Preferably, it is done just once upon introduction of the system to a new environment. The exact methodology used to create the map will depend on the sensors used and algorithms chosen to perform the necessary calculations. Once created, in one implementation, the static map is permanently stored in navigator 110. Navigator 110 can locate its position in the static map by recognizing landmarks and other physical attributes of the environment and by aligning the CDM within the static map. No origin or reference point is required. The use of certain assumptions may shorten the time and computation required to create the static map. In an office or home environment, for example, it can be assumed that walls are square and flat. Use of such assumptions decreases the time required for creating the static map.

In one implementation, the mapping process includes three maps created from sensor data derived from a pair of stereo digital cameras mounted on navigator 110. The first map in this implementation is a temporary map (TM) of navigator's 110 immediate surroundings. In particular, the temporary map is a probabilistic 3D representation created from the last stereo pair of images of the immediately surrounding environment. The second map in this implementation is the current dynamic map (CDM). The CDM is a probabilistic 3D representation of the working environment and is created by iteratively incorporating information from successive temporary maps. The CDM in this implementation is updated every time the navigator moves. The third map in this implementation is the static perimeter map (PM). As described above, the PM is created as navigator 110 follows the outer perimeter of the environment.

In another implementation, the map(s) are not created by navigator 110, but rather, are input to or preprogrammed in navigator 110. In a further implementation, a static map is not created or input before task initiation. In this implementation, navigator 110 simply starts with a blank dynamic map and updates it as tasks are performed.

b. Localization

In one embodiment, navigator 110 is responsible for navigating both itself and functional robots 120 around the mapped environment. In this embodiment, navigator 110 is responsible for all or substantially all aspects of navigation, including localization, planning and control for both itself and functional robots 120. In conventional systems, by contrast, each mobile robot is responsible for its own localization, planning and control. Each robot in such systems is responsible for navigating and maneuvering itself into the proper position to perform a task. Such systems are subject to localization calculation delays for all the robots, which makes task completion slow and inefficient. The present embodiment of the invention avoids such delays and increases efficiency by gathering all or substantially all navigation functions in one navigator robot 110 and minimizing the amount of movement for that robot.

Localization is the process by which the robot's current position, orientation and rate of change within the map is determined. Different procedures may be used for localizing the navigator and for localizing the functional robots. Localization of the functional robots is relatively simple, since the navigator, in one embodiment, is stationary or substantially stationary when localizing the functional robots and thus knows its location within the current dynamic map. In one implementation, the navigator simply tracks the functional robots using its vision systems (sensors) and then filters the vision data with a tracking filter, such as a Kalman filter. If the functional robot has moved or rotated only a short distance, the navigator's sensors 202 can detect this movement and locate the functional robot. In implementations that use a base station, the location of functional robots near the base station can also be quickly ascertained.

The unique shapes and/or geometric markings 122 on functional robots 120 may also assist navigator 110 in locating robots 120. The type of sensor 202 that is used by navigator 110 will dictate whether a unique shape or marking is used and how it is recognized. In one implementation, navigator 110 uses a neural net to process sensor data and to recognize specific shapes. In another implementation, the navigator uses its vision or sensor system to recognize any markings and/or shapes.

In addition to localizing the functional robots 120, navigator 110, in one embodiment, must localize itself after any movement. Localization of the navigator is inextricably linked with mapping, particularly with the maintenance of the current dynamic map (i.e., in order to maintain the CDM, the navigator must know where it is within the CDM). Where both a current dynamic map and a static perimeter map are used, localization involves determining the locations of both the navigator and functional robots within those maps. Note that the CDM may be preprogrammed.

The process of localizing the navigator is typically more involved than the process of localizing the functional robots. Potential methods by which the navigator may localize itself include dead reckoning, active beacon, active sensor and landmark recognition methods. Using dead reckoning, a rough estimate of the robot's change in position may be maintained using odometry and inertial navigation systems. Active beacon localization methods determine the robot's position by measuring its distance from beacons placed at known positions in the environment. Triangulation can then be used to pinpoint the robot's location. Active sensor localization methods track the robot's position with sensors, such as digital cameras, that are placed at known, fixed locations. Landmark recognition methods may be used in which the robot recognizes and knows the position of features and landmarks within the environment. The recognized landmark positions are used to calculate the robot's position.

Because of its low cost and simplicity, some form of dead reckoning (particularly odometry) is preferable in one embodiment of the invention. Dead reckoning localization errors may accumulate over time, however, due to factors such as wheel slippage and misalignment. To compensate for these errors, auxiliary techniques such as those discussed above may be used in combination with dead reckoning. Real world factors and constraints may limit the feasibility of auxiliary techniques. Active beacon and sensor methods typically require installation of foreign objects such as cameras or reflective tape in the robot's environment. While installation of such objects may be acceptable in factory and industrial settings, it is generally not acceptable in home, office and outdoor environments. For these reasons, use of landmark recognition to augment dead reckoning localization is preferred in one embodiment of the invention.

Even when dead reckoning is used in combination with an auxiliary technique such as landmark recognition, factors such as limited sensor resolution typically make localization less than completely accurate. A number of localization algorithms, such as the Markov and Monte Carlo algorithms, may be used to further improve localization accuracy.

Figure 7A:
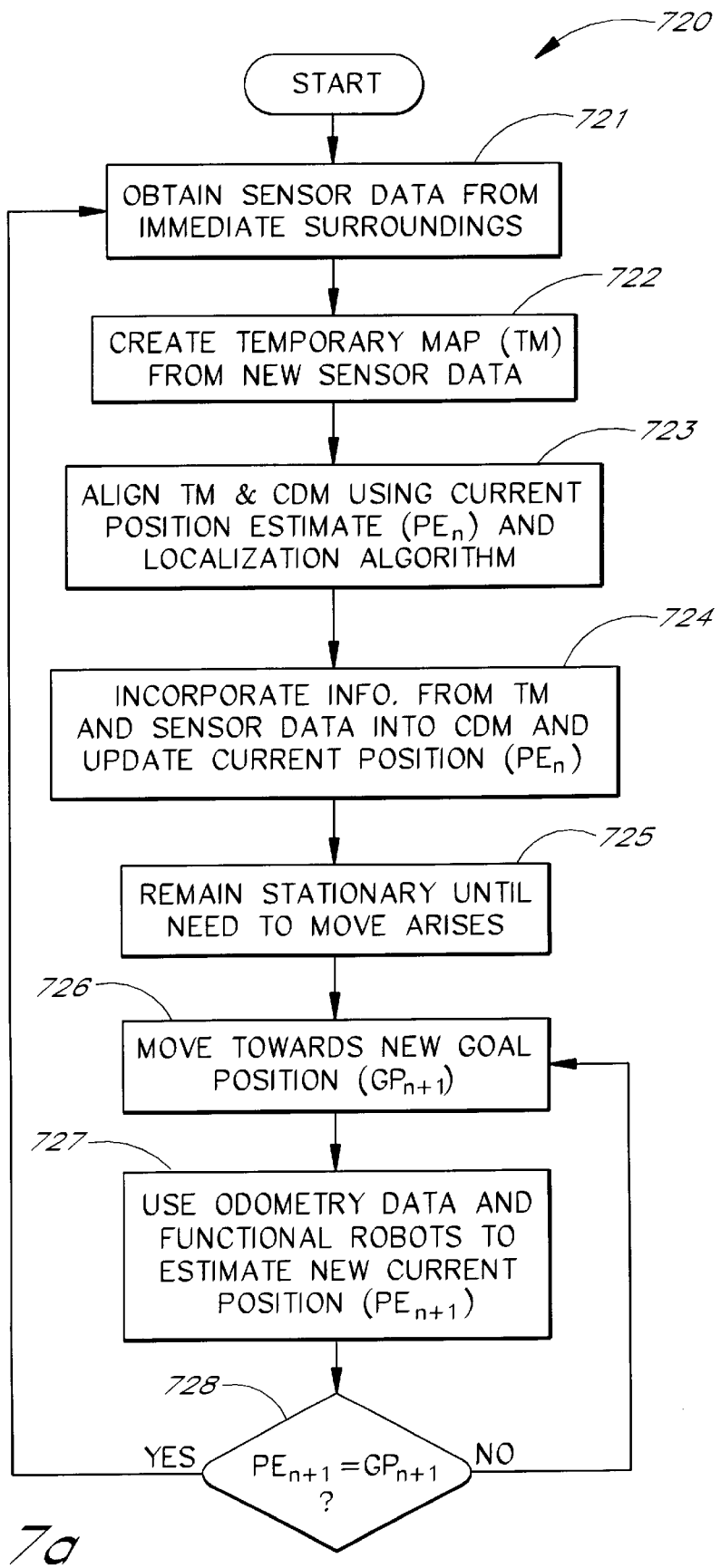
FIG. 7a is a flow diagram illustrating one method by which the navigator localizes itself within a dynamic map of the environment.

FIG. 7a is a flowchart illustrating the substeps that may be involved in one embodiment of the mapping and localization process 720 for navigator 110. At step 721, navigator 110 obtains sensor data from its immediate surroundings. In one embodiment, a pair of digital stereo cameras is used to obtain the sensor data. From the stereo image pair, a new temporary map (TM)is created in step 722 and aligned relative to the current dynamic map (CDM) (step 723) In order to align the temporary and current maps, a set of position estimates $PE_{n+1,1} \ldots PE_{n+1,m}$ is generated. A localization algorithm such as the Markov or Monte Carlo localization algorithms may be used to generate this set of estimates. The range of error in the position estimates will dictate how large the factor m is. The best estimate $PE_{n+1,k}$ ($1 \leq k \leq m$) from the range is selected, and using $PE_{n+1,k}$, information is extracted from the temporary map and sensor data and added to the current dynamic map (step 724). The temporary map is then discarded.

Navigator 110 may remain stationary (step 725) to minimize computation. In one embodiment, the navigator 110 tracks and controls the functional robots while stationary as described below. Eventually navigator 110 needs to move and begins to move towards a new goal position $GP_{n+1}$ (step 726). As navigator 110 moves, it may collect odometry data (using in one implementation dead reckoning methods as described above) for use in obtaining an estimate of its distance and orientation from $PE_n$ (step 727). In one embodiment, navigator 110 also tracks the position of one or more functional robots or other recognized landmarks (through a tracking filter) in order to provide an improved estimate of its current position. When, through use of dead reckoning and landmark recognition as described above, navigator 110 determines that its latest position estimate $PE_{n+1}$ is within an acceptable threshold relative to the new goal position $GP_{n+1}$ (decision node 728), it stops and returns to step 711 to repeat the localization and mapping process.

c. Preplanning

Figure 7B:
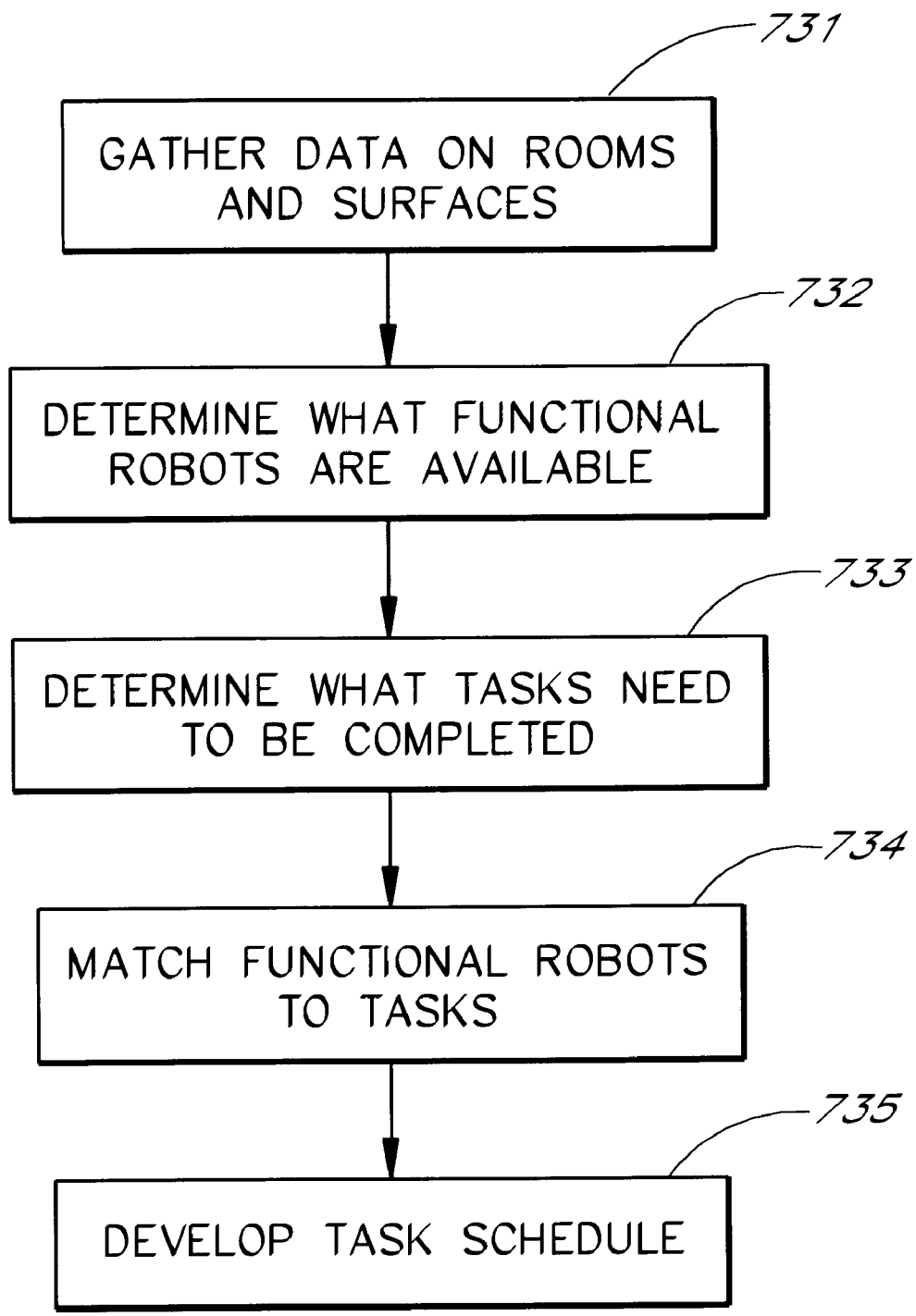
FIG. 7b is a flow diagram illustrating one method by which the navigator performs preplanning.

In one embodiment, navigator 110 may gather information about the environment and perform information gathering and preplanning. The various substeps that may be involved in one embodiment of the information gathering and preplanning processes are illustrated in more detail in FIG. 7b. It should be noted that the steps illustrated in FIG. 7b may be performed in any order, and that each of the steps is optional. That is, information gathering and preplanning may be accomplished without some of the listed steps, and some of the listed steps may be preprogrammed or input to navigator 110.

In step 731, navigator 110 gathers additional data such as the characteristics of the room or environment in which one or more of the functional robots are present(i.e., size, cleaning requirements, etc.) and the types of surfaces present in those rooms. In one embodiment, data is collected for each of the functional robots in the system. This data may be gathered using the same sensors used for mapping and localization or, alternatively, different sensors may be used to gather the data. If a sonar sensor is used for mapping and localization, for example, it may be necessary to use a different sensor such as a camera for gathering data such as room surface types.

In step 732, navigator 110 determines what functional robots 120 are available for task performance. Alternatively, this information may be input to or preprogrammed in navigator 110, or it may simply be unnecessary information. Next, in step 733, navigator 110 determines what tasks need to be performed. Again, this information may be preprogrammed in navigator 110, input via an interface, or determined via a combination of preprogramming and input.

Using the information gathered in steps 731–733, navigator 110 matches the available functional robots to the tasks to be performed (step 734) and develops a task schedule (step 735). Each task may be divided into subtasks in order to minimize navigator movement and increase efficiency.

d. Planning and Control

Figure 7C:
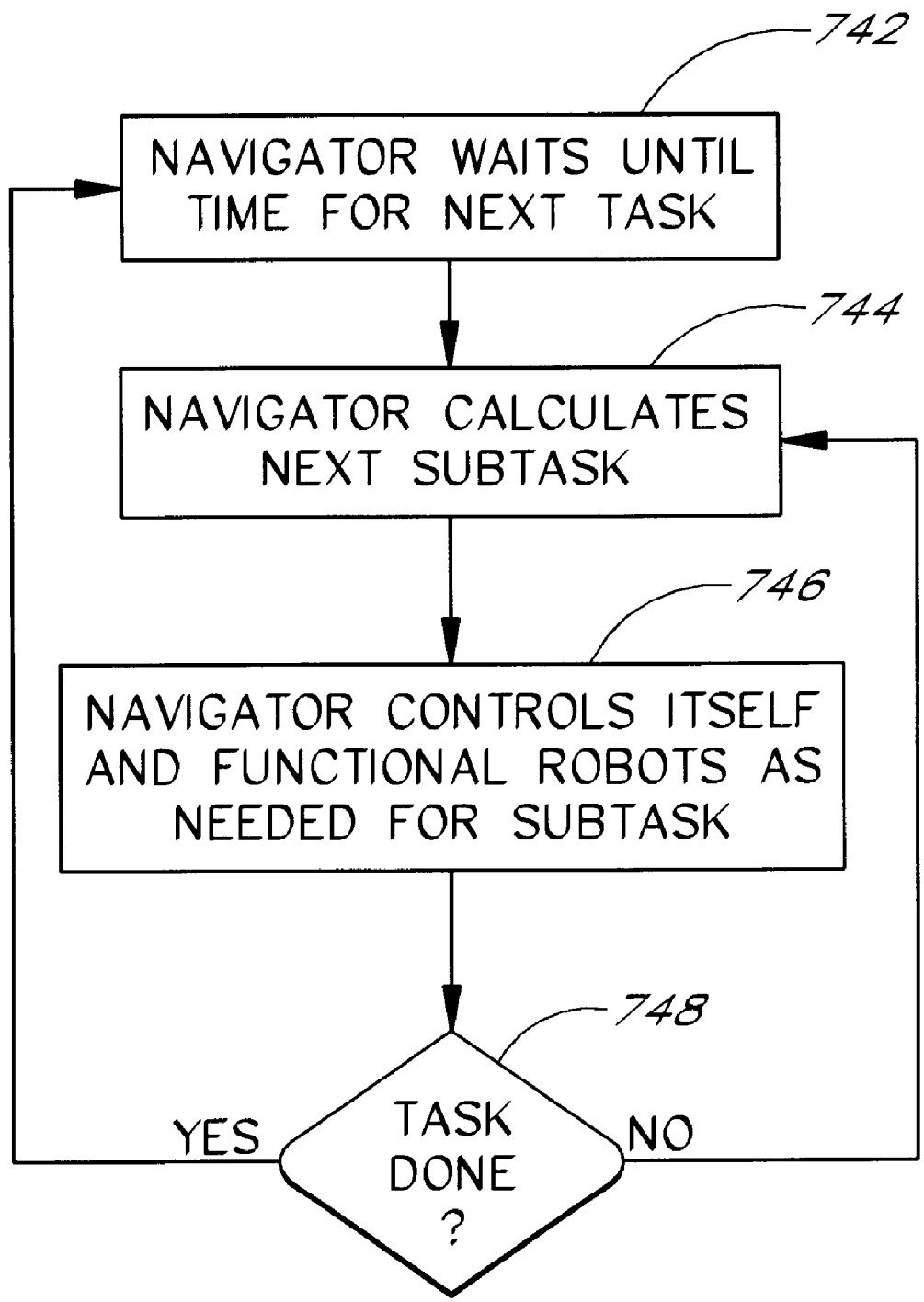
FIG. 7c is a flow diagram illustrating one method by which the navigator controls and tracks functional robots during task performance.

In one embodiment, navigator 110 controls functional robots 120 to perform the scheduled tasks. The steps involved in planning and control are illustrated in more detail in FIG. 7c. At step 742, navigator 110 waits for the time (according to the task schedule developed as described above) to begin performing the next scheduled task. At or before the time arrives for the next task, in step 744, navigator 110 recursively calculates the next lowest level subtask. Examples of lowest level subtasks include turning on motors and tracking a robot until an event occurs. The navigator moves itself or moves and/or controls the appropriate functional robot(s) to perform each subtask (step 746). Navigator 110 issues appropriate control signals 209 to functional robots 120 via its transmitter 208 (see FIG. 3). This planning and control loop is iterated until the entire task is complete (decision node 748).

Navigator 110 directs functional robots 120 along the planned routes using the functional robots' control loops. As described above, in one embodiment, the control loop for moving and maneuvering robot 120 comprises power source and power supply system 402, motor controller 404, motor 406 and wheels 408. Control signals received from navigator 110 via receiver 302 direct motor controller 404. Controller 404 controls motor 406, which in turn drives wheels 408. The control loop may also comprise servos, actuators, transmitters and the like.

Figure 5:
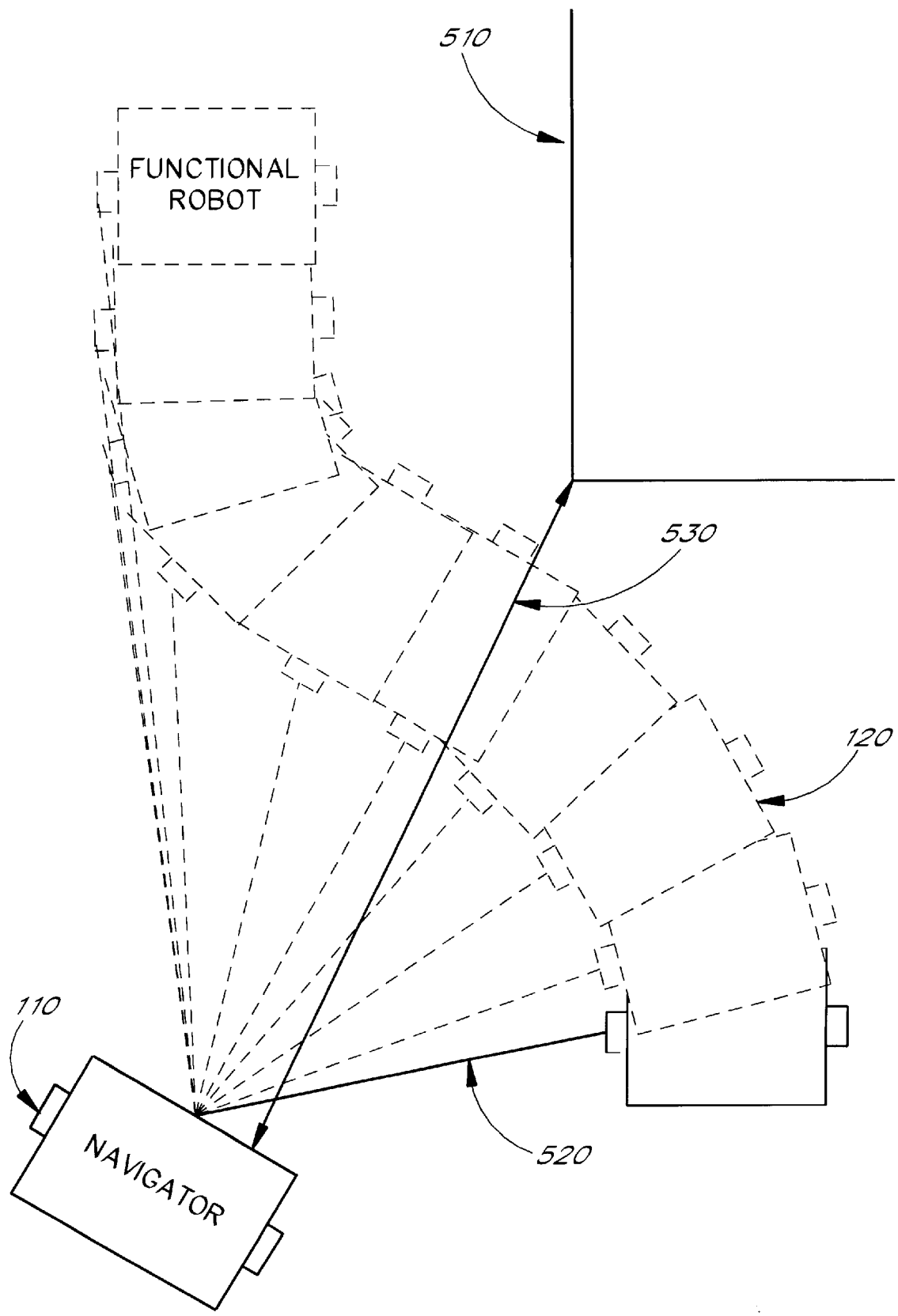
FIG. 5 is a block diagram depicting a navigator as it maneuvers a functional robot around an obstacle.

While functional robot 120 is moving, in one embodiment, navigator 110 remains stationary and tracks the functional robot's progress. A number of suitable tracking algorithms will be familiar to those of ordinary skill in the art. Keeping navigator 110 motionless vastly reduces the localization computational overhead associated with the tracking algorithms. Moreover, use of a stationary navigator reduces delays associated with navigating around unforeseen obstacles. Navigator 110 can first use a functional robot to test the planned route. If a collision occurs, navigator 110 still knows its own position and can track the position of the functional robot as it directs it to travel an alternate path. As shown in FIG. 5, navigator 110 can "see" obstacles 510 via sensor input 530 and can direct a functional robot 120 around the obstacle 510 via control loops 520. This is far less computationally intensive than if navigator 110 itself needed to perform the tasks of a functional robot, or if the functional robot 120 needed to perform the tracking process.

In one embodiment, navigator 10 is able to track and control the functional robots while the functional robots are moving at rate substantially faster than that found in conventional systems. In particular, in one embodiment, the present system is capable of movement at a rate substantially faster than one foot per second per 1,000 MIPS. Additionally, navigator 110 may have sufficient processing power to perform some or all mapping and localization functions while simultaneously tracking and controlling the functional robots.

Eventually, navigator 110 may need to reposition itself in order to continue tracking functional robots 120. Typically, this will occur when the functional robots need to move far away or have moved out of view. When navigator 110 determines that it needs to reposition itself, in one embodiment, it commands the functional robots to cease movement, and then moves, using the functional robot as a landmark.

Figure 6:
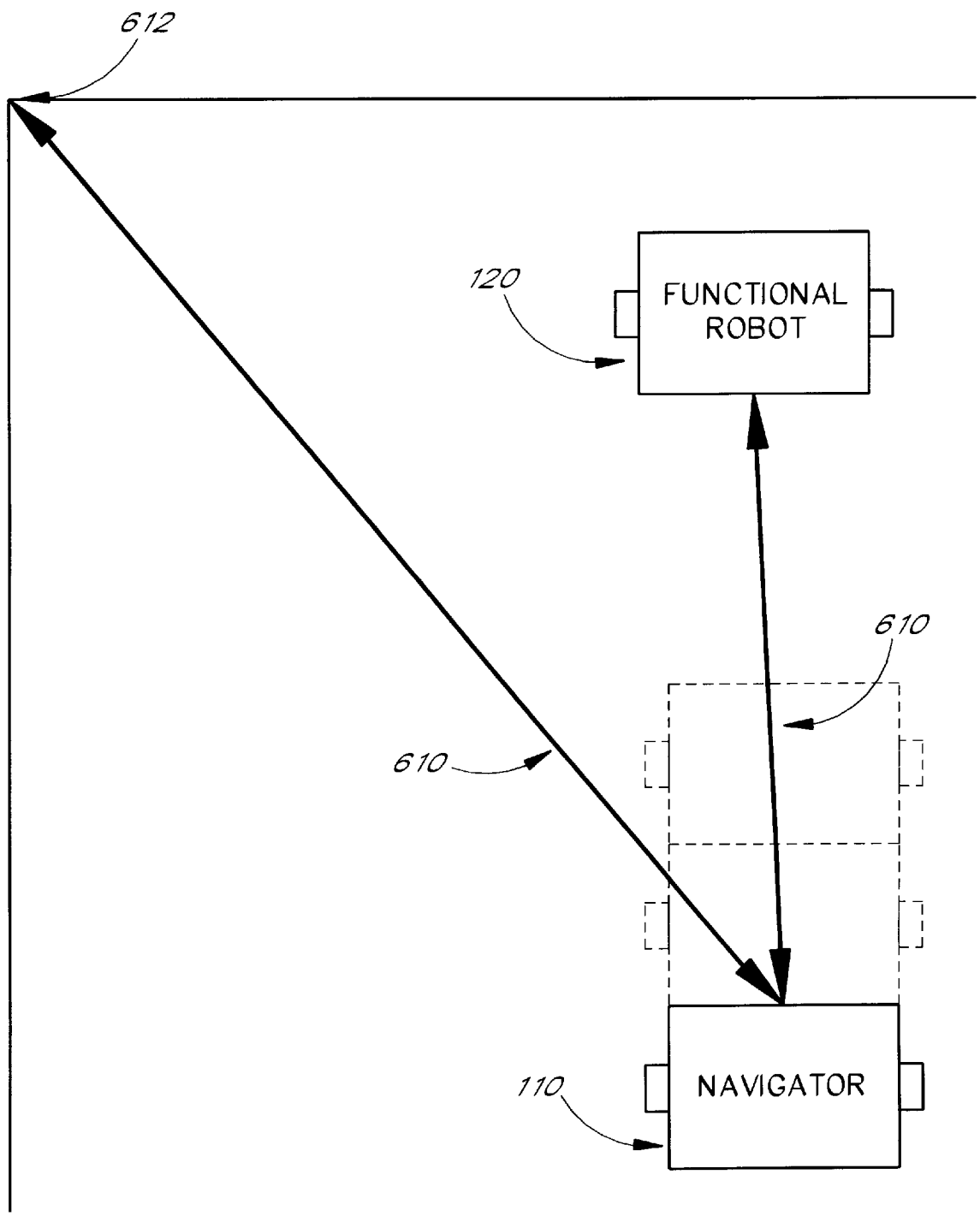
FIG. 6 is a block diagram depicting a navigator as it maneuvers itself towards a functional robot.

As shown in FIG. 6, in one implementation, when navigator 110 is moving, it uses sensor input 610 to triangulate on a functional robot 120 and another landmark 612 such as the corner of a room or window. Using this data, navigator 110 then moves into proper position. When navigator 110 arrives at the new location, it undertakes dynamic mapping and localization (as described above) to ensure that it knows where it is. This process may take several minutes as landmarks may be distant or obscured, and errors may be present in the map or location data. This iterative process is relatively quick compared to traditional methods, since at least one landmark having precisely known dimensions is always nearby navigator 110. Once navigator 110 has moved sufficiently close to functional robots 120, in one implementation, the method returns to step 744 (FIG. 7*c*) and navigator 110 calculates the next subtask to further task performance. The recursive calculation of subtasks is based on algorithms that minimize the movement of the navigator.

In one implementation, navigator 110 tracks the functional robot(s) as they perform the tasks. In one implementation, navigator 110 uses a motion model of the movement required by the task to assist in tracking the robots. The motion model comprises the expected linear and angular velocities and accelerations of the functional robots for a given surface type and set of inputs to the robot's motors and actuators. Once the motion model provides a rough estimate of the functional robot's location, navigator 110 can use its sensors 202 to obtain more accurate data. Various filtering algorithms may be used to filter motion model errors. In one implementation, Kalman filtering is used. Other suitable filtering algorithms known to those of ordinary skill in the art, such as g-h and Benedict-Bordner, may also be used. In essence, x-y and orientation data is tracked and the filtering algorithm reduces errors due to the motion model and sensor input.

At decision node 748 (FIG. 7*c*), navigator 110 determines whether the entire task or subtask is complete. If the task is complete, the method returns to step 742 and navigator 110 waits for the time to begin the next task or subtask. In one implementation, completion of the task includes the navigator 110 and functional robots returning to a base station 130 (FIG. 1) for recharging. In this regard, it should be noted that throughout movement and task performance, navigator 110 may estimate or monitor the power levels of the functional robots and return them for recharging as is necessary.

In moving and performing their tasks, some functional robots, such as vacuum cleaners, may require power from wall outlets rather than from a self-contained power supply. In a system using such robots, navigator 110 and the functional robot may work as a team to locate a wall outlet and plug the functional robot into the outlet. When the functional robot(s) need to move too far from a particular outlet, navigator 110 and the functional robots can unplug from that outlet and move to another.

The advance that the present invention represents over prior systems is best represented by example. Consider the task of vacuuming a 20'×20' room. Assume, due to the robot's dimensions, that a robot has to move eight linear feet to clean one square foot of floor. With a localization algorithm that requires two seconds of processing per linear foot traveled on a 100 MIPS processor, the localization calculation would consume 20×20×8×2=6400 seconds. This is a calculation delay of approximately 1 ¾ hours.

In accordance with the present invention, by contrast, in one embodiment, a functional robot 120 performs all or substantially all vacuuming under control of navigator 110. Assuming that navigator 110 must move four times during vacuuming to locations that are 10 feet apart, using a tracking algorithm that requires 40 milliseconds per linear foot traveled, the localization calculations require:

4×10×2=80 seconds for navigator 110; and

20×20×8×0.04=128 seconds for the functional robot.

The total delay is only 208 seconds, which represents an improvement by more than a factor of 30.

4. Alternate Embodiments

One embodiment of the invention has been shown and described above. Alternate embodiments of the invention are also envisioned. A second embodiment of the invention, for example, contemplates use of more than one navigator. In the second embodiment, a first or navigator set of platforms (mobile robots) is responsible for all or substantially all mapping, localization, planning and control functions, and a second or functional set of platforms is responsible for functional task completion. The first set of robots, then, is responsible for planning, navigating and tracking task performance by the second set of robots. The second embodiment of the invention may be appropriate where there are too many functional robots for one navigator to command and control, or where the functional robots are spread out over a particularly large geographic area.

In a third embodiment of the invention, each robot is configured both as a navigator and as a functional robot. A robot engaged in movement or task performance has some or all of its navigation and associated computation performed by one or more of the other robots. The other robots may remain stationary while performing this navigation and computation. The robots can communicate positional data via a wireless communications link. This embodiment further simplifies localization since the robots track each other, and no robot has to track itself.

In a fourth embodiment of the invention, functional robots that are also capable of mapping, localization, planning and control are again used. In this embodiment, however, the functional robots carry one or more active or passive beacons along with themselves. The robots position the beacon(s) and then use their distances from the beacon(s) in order to triangulate their position.

Finally, in any of the foregoing embodiments, a stationary computer or another mobile platform could be dedicated to perform some or all of the processing and computation. In such a configuration, each navigator may be equipped with appropriate sensors for gathering data. The sensor data, either raw or partially processed, may be transmitted to the dedicated computer or other mobile platform for further processing via a wireless network or any other suitable means for communication. The dedicated computer may perform the necessary computations, and communicate the results to the navigator robot.

5. Method of Implementing a Multi-Platform Robot System

Figure 8:
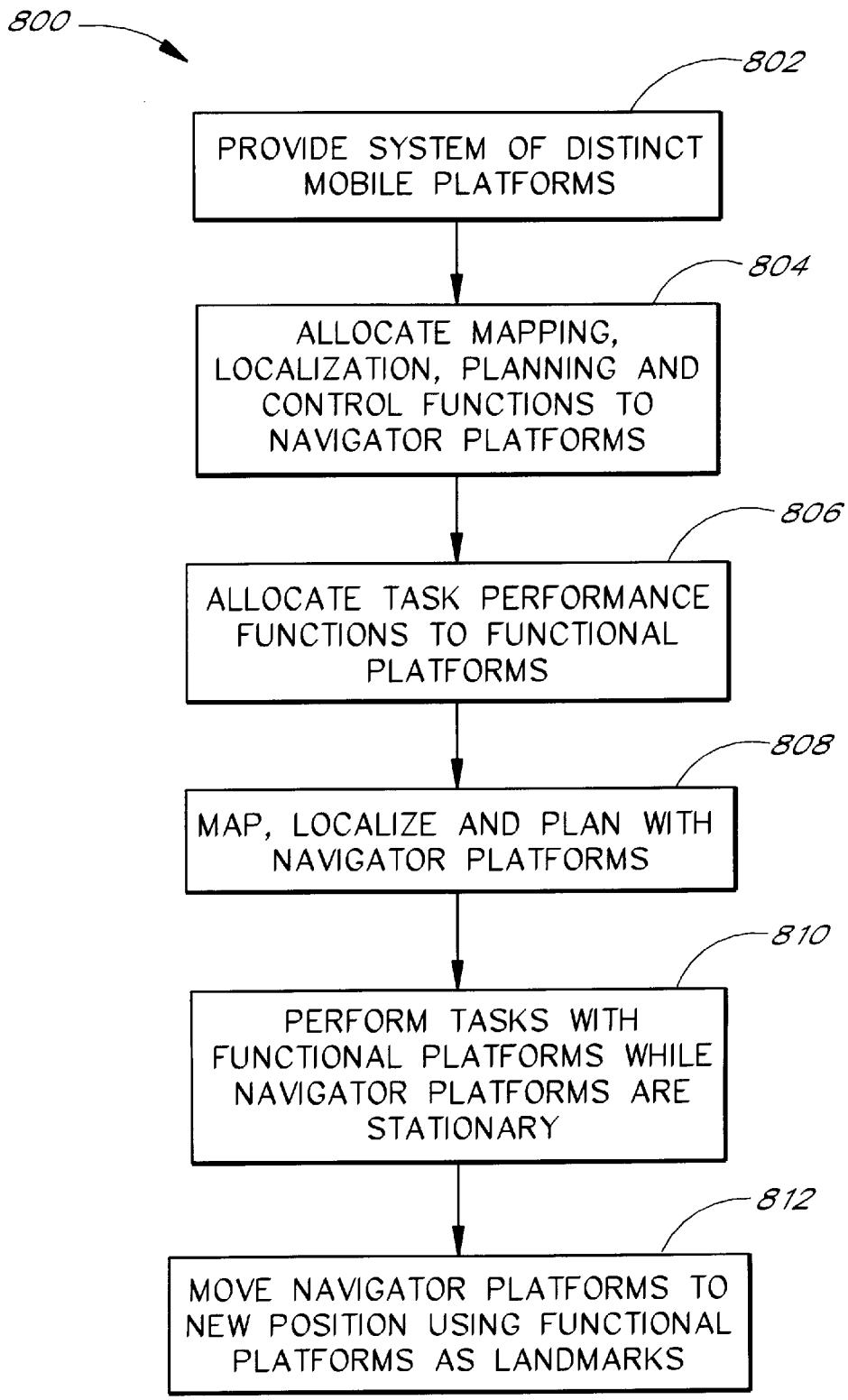
FIG. 8 is a flow diagram showing a method for implementing a multi-robot system according to the present invention.

A method 800 for implementing the system of the present invention is depicted in FIG. 8. In step 802, an autonomous system comprised of two or more physically distinct mobile platforms is provided. In step 804, the functions of mapping, localization, planning and control are assigned to a first subset of the system comprising at least one of the distinct physical platforms. The platforms contained in this first subset are referred to as the navigator platforms.

In step 806, the responsibility for functional task completion is assigned to a second subset of the system comprising the platforms not within the first subset. The platforms contained in this second subset are referred to as the functional platforms. In step 808, the navigator platforms map the environment, localize all robots within the environment and plan a task performance schedule. These tasks may be sub-divided into smaller tasks to facilitate easier tracking and to limit the need to move the navigators. In step 810, the navigators may remain stationary while controlling the functional platforms to perform the assigned tasks. In step 812, which is optional, the navigators may move to a new position using one or more of the functional platforms as a landmark.

Various embodiments of the present invention have been shown and described above. These embodiments are presented by way of example only, and should not be construed as limiting the scope of the invention, which is defined by the following claims and their equivalents.

What is claimed is:

1. A method for autonomous, multi-robot operation within an environment comprising the following steps:

(a) providing at least one navigator robot and at least one functional robot;

(b) with the at least one navigator robot, creating a map of the environment;

(c) with the at least one navigator robot, localizing the at least one navigator robot and the at least one functional robot within the map;

(d) with the at least one navigator robot, planning tasks to be performed by the at least one functional robot;

(e) with the at least one functional robot, performing the tasks planned by the at least one navigator robot; and (f) with the at least one navigator robot, controlling and tracking the at least one functional robot during task performance.

2. A method as claimed in claim 1, wherein step (b) comprises creating a current dynamic map using the following substeps:

obtaining sensor data from the immediate surroundings of the navigator robot;

creating a temporary map from the sensor data obtained;

incorporating the temporary map into a current dynamic map;

moving the navigator robot to a new location; and repeating step (b) by obtaining sensor data at the new location.

3. A method as claimed in claim 2, wherein step (b) further comprises creating a static perimeter map by following and mapping the outer perimeter of the environment.

4. A method as claimed in claim 1, wherein in step (c), localizing the functional robot comprises tracking the functional robot using a visual system mounted on the navigator robot.

5. A method as claimed in claim 1, wherein in step (c), localizing the navigator robot comprises the following substeps:

moving the navigator robot towards a new position;

using dead reckoning and landmark recognition techniques to estimate the current position of the navigator robot;

determining whether the current position is approximately equal to the new position and, if it is not, continuing to move towards the new position;

if the current position is approximately equal to the new position, stopping the navigator robot and obtaining new sensor data, creating a temporary map from the new sensor data, using a localization algorithm to align the temporary map with a map of the environment, and incorporating information from the temporary map into the map of the environment.

6. A method as claimed in claim 1, wherein step (d) comprises at least one substep selected from the group comprising:

gathering data on rooms and surfaces within the environment;

determining what functional robots are available to perform tasks;

determining what tasks need to be completed;

matching the available functional robots to the tasks that need to be completed; and developing a task schedule.

7. A method as claimed in claim 1, wherein step (f) comprises the following substeps:

commanding the functional robot to move into a proper position to begin task performance;

tracking the functional robot as it moves toward the proper position;

if the functional robot moves too far away to allow tracking, commanding the functional robot to stop and moving the navigator robot closer to the functional robot;

when the functional robot reaches the proper position, commanding the functional robot to begin task performance; and tracking the functional robot during task performance.

8. A method as claimed in claim 7, wherein the navigator robot remains stationary while tracking the movement and task performance of the functional robot.

9. A method of implementing an autonomous mobile platform system within an environment comprising the following steps:

providing multiple mobile platforms;

allocating mapping, localization, planning and control functions to a first set of the mobile platforms;

allocating functional task performance functions to a second set of the mobile platforms;

mapping the environment, localizing substantially all platforms within the environment and planning task performance with the first set of mobile platforms;

performing the tasks with the second set of mobile platforms; and controlling and tracking the task performance by the second set of platforms with the first set of platforms.

10. A method as claimed in claim 9, wherein the first set of platforms remain stationary while controlling and tracking task performance by second set of platforms.

11. A method as claimed in claim 10, wherein the first set of platforms move to a new position using the second set of platforms as a landmark.

12. A system of autonomous robots comprising:

at least one first mobile robot configured to performed one or more repetitive tasks within an area; and at least one second robot configured to direct overall movement of the at least one first robot in the area.

13. The system of claim 12 in which the at least one second robot is configured to map the area.

14. The system of claim 13 wherein the at least second robot is configured to determine the location of the at least one first robot within the area.

15. The system of claim 14 wherein the at least one second robot is configured to plan overall movement of the at least one first robot within the area.

16. The system of claim 15 wherein the at least one second robot is configured to track overall movement of the at least one first robot within the area.

17. A method of performing a repetitive task within an area comprising the steps of:

performing the repetitive task with at least one first mobile robot; and directing overall movement at the at least one first robot in the area with at least one second robot.

18. The method of claim 17 further comprising mapping the area with the at least one second robot.

19. The method of claim 18 further comprising determining the location of the at least one first robot using the at least one second robot.

20. The method of claim 19 further comprising planning the overall movement of the at least one first robot in the area using the at least one second robot.

21. The method of claim 20 further comprising tracking the overall movement of the at least one first robot in the area using the at least one second robot.

22. A system of autonomous, mobile robots operating within an environment and comprising:
one or more functional mobile robot(s) that are responsible for performing functional tasks;
one or more navigator mobile robot(s) that localize themselves and the functional robot(s) within the environment, plan the tasks to be performed by the functional robot(s), and control the functional robot(s) during task performance, wherein each navigator robot comprises:
one or more sensors for gathering data from the environment;
a controller for directing the operations of both the navigator and the functional robot(s);
a memory for storing maps of the environment; and
a transmitter for transmitting control signals to the functional robot(s); and
wherein each navigator robot generates a dynamic map of the environment by obtaining sensor data from its immediate surroundings, creating a temporary map from the sensor data, incorporating the temporary map into the dynamic map, and moving to a new location to obtain new sensor data.

23. A system of autonomous, mobile robots operating within an environment and comprising:
one or more functional mobile robot(s) that are responsible for performing functional tasks;
one or more navigator mobile robot(s) that localize themselves and the functional robot(s) within the environment, plan the tasks to be performed by the functional robot(s), and control the functional robot(s) during task performance, wherein each navigator robot comprises:
one or more sensors for gathering data from the environment;
a controller for directing the operations of both the navigator and the functional robot(s);
a memory for storing maps of the environment; and
a transmitter for transmitting control signals to the functional robot(s); and
wherein each navigator robot generates a static map of the environment by following and mapping the outer perimeter of the environment.

24. A system of autonomous, mobile robots operating within an environment and comprising:
one or more functional mobile robot(s) that are responsible for performing functional tasks;
one or more navigator mobile robot(s) that localize themselves and the functional robot(s) within the environment, plan the tasks to be performed by the functional robot(s), and control the functional robot(s) during task performance, wherein each navigator robot comprises:
one or more sensors for gathering data from the environment;
a controller for directing the operations of both the navigator and the functional robot(s);
a memory for storing maps of the environment; and
a transmitter for transmitting control signals to the functional robot(s); and
wherein each navigator robot stores the tasks to be performed by the functional robot in the memory.

25. A system as claimed in claim 24, wherein the navigator robot plans the tasks to be performed by the functional robot(s) by determining what tasks need to be completed, matching the functional robot(s) to a particular task, and developing a task schedule.

26. A system of autonomous, mobile robots operating within an environment and comprising:
one or more functional mobile robot(s) that are responsible for performing functional tasks;
one or more navigator mobile robot(s) that localize themselves and the functional robot(s) within the environment, plan the tasks to be performed by the functional robot(s), and control the functional robot(s) during task performance; and
a base station for assisting in task completion, tracking of functional robot(s) and recharging of the robots.

27. A system of autonomous, mobile robots operating within an environment and comprising:
one or more functional mobile robot(s) that are responsible for performing functional tasks;
one or more navigator mobile robot(s) that localize themselves and the functional robot(s) within the environment, plan the tasks to be performed by the functional robot(s), and control the functional robot(s) during task performance; and
wherein computations associated with localization, planning and control are performed by a stationary computer and communicated to the navigator robot(s).

* * * * *